United States Patent
Naguib

(10) Patent No.: US 8,670,504 B2
(45) Date of Patent: Mar. 11, 2014

(54) BEAMSPACE-TIME CODING BASED ON CHANNEL QUALITY FEEDBACK

(75) Inventor: Ayman Fawzy Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 662 days.

(21) Appl. No.: 11/684,321

(22) Filed: Mar. 9, 2007

(65) Prior Publication Data

US 2008/0144737 A1 Jun. 19, 2008

Related U.S. Application Data

(60) Provisional application No. 60/870,654, filed on Dec. 19, 2006.

(51) Int. Cl.
*H04L 27/00* (2006.01)
(52) U.S. Cl.
USPC .......................................... 375/299
(58) Field of Classification Search
USPC ................. 375/146, 219, 259, 267, 299, 347; 455/69, 73, 101, 272, 446, 561; 370/210, 328, 334, 335, 336
See application file for complete search history.

(56) References Cited

U.S. PATENT DOCUMENTS

| | | | |
|---|---|---|---|
| 5,625,876 A | 4/1997 | Gilhousen et al. | |
| 2002/0150065 A1 | 10/2002 | Ponnekanti | |
| 2003/0009226 A1 | 1/2003 | Graf | |
| 2003/0148770 A1 * | 8/2003 | Das et al. | 455/455 |
| 2005/0084029 A1 * | 4/2005 | Lim | 375/267 |
| 2005/0157683 A1 * | 7/2005 | Ylitalo et al. | 370/334 |
| 2005/0195912 A1 * | 9/2005 | Kim et al. | 375/267 |
| 2005/0272432 A1 | 12/2005 | Ji et al. | |

(Continued)

FOREIGN PATENT DOCUMENTS

| | | |
|---|---|---|
| CN | 1327644 A | 12/2001 |
| EP | 1229669 A1 * | 8/2002 |

(Continued)

OTHER PUBLICATIONS

International Search Report and Written Opinion—PCT/US2007/088083, International Search Authority—European Patent Office—Jul. 4, 2008.

(Continued)

*Primary Examiner* — Sam K Ahn
*Assistant Examiner* — Syed Haider
(74) *Attorney, Agent, or Firm* — Charles E. Eggers

(57) ABSTRACT

Methods and apparatus for increasing diversity gain at a receiver by applying beamforming to transmit diversity space-time coded signals. A transmit signal is space-time coded over a plurality of space-time antenna groups, with each space-time antenna group associated with a specific space-time code. The signal at each space-time antenna group is beamformed over the plurality of antenna in the space-time antenna group. Each of the plurality of antenna in a space-time antenna group is weighted with a distinct weight, relative to the other antenna in the space-time group. The beamforming weights can vary based on a channel quality feedback indication from a receiver. The amplitude, phase, or a combination of amplitude and phase of each weight or of a vector of multiple weights can vary as a function of the channel quality indication in order to improve the quality of the received signal.

18 Claims, 10 Drawing Sheets

(56) References Cited

U.S. PATENT DOCUMENTS

| | | | |
|---|---|---|---|
| 2005/0281226 A1* | 12/2005 | Lee et al. | 370/329 |
| 2006/0030364 A1* | 2/2006 | Olesen et al. | 455/562.1 |
| 2006/0120477 A1* | 6/2006 | Shen et al. | 375/267 |
| 2006/0270360 A1* | 11/2006 | Han et al. | 455/69 |
| 2007/0183533 A1* | 8/2007 | Schmidl et al. | 375/299 |
| 2008/0101304 A1* | 5/2008 | Alfred et al. | 370/336 |
| 2008/0108310 A1* | 5/2008 | Tong et al. | 455/69 |

FOREIGN PATENT DOCUMENTS

| | | | |
|---|---|---|---|
| EP | 1284545 | A1 | 2/2003 |
| EP | 1487134 | A1 | 12/2004 |
| JP | 2002314483 | A | 10/2002 |
| JP | 2003500977 | A | 1/2003 |
| JP | 2004502376 | | 1/2004 |
| JP | 2004507151 | A | 3/2004 |
| JP | 2005503045 | A | 1/2005 |
| KR | 20030034083 | A | 5/2003 |
| KR | 20040034083 | A | 4/2004 |
| RU | 2202855 | | 4/2003 |
| WO | WO 9944313 | | 9/1999 |
| WO | 0072465 | A1 | 11/2000 |
| WO | 0201732 | A2 | 1/2002 |
| WO | 0215432 | A1 | 2/2002 |
| WO | 02080375 | A2 | 10/2002 |

OTHER PUBLICATIONS

Li Liu et al: "Combining beamforming and quasi-orthogonal space-time block coding using channel mean feedback" GLOBECOM"03. 2003—IEEE Global Telecommunications Conference. Conference Proceedings. San Francisco, Dec. 1-5, 2003, IEEE Global Telecommunications Conference, New York, NY: IEEE, US, vol. vol. 7 of 7, Dec. 1, 2003, pp. 1925-1930, I,SBN: 0-7803-7974-8.

S. Conversy and J-D. Fekete: "The svgl toolkit: enabling fast rendering of rich 2D graphics" Technical Report—Ecole Des Mines De Nantes, No. 02/01/info, 2002, pp. 1-11, XP002539626 France.

Taiwan Search Report—TW096148776—TIPO—Mar. 3, 2012.

\* cited by examiner

BEAMSPACE-TIME CODING BASED ON CHANNEL QUALITY FEEDBACK

CLAIM OF PRIORITY UNDER 35 U.S.C. §119

The present Application for Patent claims priority to Provisional Application No. 60/870,654 entitled "BEAMSPACE-TIME CODING BASED ON CHANNEL QUALITY FEEDBACK" filed Dec. 19, 2006, and assigned to the assignee hereof and hereby expressly incorporated by reference herein.

BACKGROUND

Wireless communication devices are configured to operate in a variety of operating conditions and operating environments. A mobile wireless device can experience drastic changes in signal quality based on its location relative to the transmitting signal source. The variations in signal quality can be characterized by changes in the wireless channel linking the transmitter to the wireless receiver.

There are many factors that contribute to the wireless channel. For example, received signal strength decreases as the distance between the transmitter and receiver increases. Additionally, variations in the terrain and the presence of obstructions and reflective surfaces contributes to multipath. The signals traversing the multiple signal paths from the transmitter to a receiver can constructively or destructively combine. Destructive signal combination due to, for example, a phase rotation in a multi-path signal component can result in substantially reduced signal quality at the receiver. A reduced signal quality is often referred to as a signal fade, or simply, a fade.

Wireless communication systems can implement a variety of techniques to compensate for the probability of operating in a deep fade. A wireless communication system can implement signal diversity to help compensate for fades. Diversity refers generally to implementing some type of redundancy to provide or resolve independent signal paths.

A transmitter can provide diversity by introducing a distinct resolvable signal, such that a receiver has an increased probability of receiving and resolving the transmitted signal. The transmitter can introduce diversity using a plurality of transmit antennas, a plurality of transmit frequencies, a plurality of transmit times, or some combination thereof.

For example, transmit diversity can achieved by sending an original information symbol from one antenna and sending a modified version of that symbol from a second antenna. The modified version of the original symbol can refer to a version of the original symbol that is delayed, conjugated, negated, rotated, and the like, or a combination of some or all the above. A rotated signal refers to a complex rotation of the signal phase relative to a reference. The receiver process the total received signal over one or more symbol periods to recover the transmitted symbol.

Similarly, a receiver can provide a limited amount of diversity through the use of multiple receive antennas that are spatially diverse. Preferably, the multiple receive antennas are spaced at a distance that enables each antenna to experience channel characteristics that are independent of the channel experienced by the other receive antennas.

SUMMARY

Methods and apparatus for increasing diversity gain at a receiver by applying beamforming to transmit diversity space-time coded signals. A transmit signal is space-time coded over a plurality of space-time antenna groups, with each space-time antenna group associated with a specific space-time code. The signal at each space-time antenna group is beamformed over the plurality of antenna in the space-time antenna group. Each of the plurality of antenna in a space-time antenna group is weighted with a distinct weight, relative to the other antenna in the space-time group. The beamforming weights can vary based on a channel quality feedback indication from a receiver. The amplitude, phase, or a combination of amplitude and phase of each weight or of a vector of multiple weights can vary as a function of the channel quality indication in order to improve the quality of the received signal.

Aspects of the disclosure include a method for providing transmit diversity. The method includes generating a plurality of space-time encode signals from a transmit signal, receiving a channel quality indication, generating at least one weight vector based on the channel quality indication, and beamforming at least one of the plurality of space-time encoded signals using a corresponding weight vector from the at least one weight vector.

Aspects of the disclosure include a method for providing transmit diversity. The method includes generating a plurality of space-time encode signals from a transmit signal, receiving a channel quality indication, and beamforming each of the space-time encode signals using a corresponding weight vector, wherein at least one weight vector is determined, in part, based on the channel quality indication.

Aspects of the disclosure include a method of optimizing transmit diversity. The method includes receiving a plurality of signals, each of the plurality of signals received in a corresponding signal beam, determining a channel estimate for each signal beam, determining a channel quality indication based on the channel estimates, and transmitting the channel quality indication as feedback information to a transmit source of the signal beams.

Aspects of the disclosure include an apparatus for providing transmit diversity that includes a transmitter configured to generate a transmit signal stream, a transmit diversity encoder configured to receive the transmit signal stream and configured to generate a plurality, G, of transmit diversity/space-time encoded transmit streams from the transmit signal stream, a weight matrix generator configured to receive a channel quality indication and generate at least one weight vector from a set of weight vectors based on the channel quality indication, and a plurality of beamforming encoders, each of the plurality of beamforming encoders configured to receive one of the plurality of transmit diversity/space-time encoded transmit streams and generate a plurality, K, of weighted substreams based on a weight vector from the set of weight vectors to beamform the one of the plurality of transmit diversity/space-time encoded transmit streams.

Aspects of the disclosure include an apparatus for providing transmit diversity that includes a receiver configured to receive a plurality of space-time encoded transmit signals in a plurality of beams, wherein each space-time encoded transmit signal is carried within a distinct beam, a pilot extraction module coupled to the receiver and configured to extract at least one pilot signal from each beam, a channel estimation module coupled to the pilot extraction module and configured to determine a channel estimate for each of the plurality of beams based on the at least one pilot signal, a channel quality indication generator configured to determine a channel quality indication based on the channel estimates, a transmitter configured to generate a feedback message including the channel quality indication and transmit the feedback message to a source of the space-time encoded transmit signals.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE DISCLOSURE

Methods and apparatus are described for generating and transmitting wireless signals that combine the benefits of transmit diversity/space-time coding and beamforming. A transmitter is equipped with N transmit antennas. The N transmit antennas are then divided into G groups of antennas where G≤N. In each group of antennas, the antennas are weighted by a weight vector $w_g=[w_{g1}\ w_{g2}\ \ldots\ w_{g,N/G}]$ to form a beam.

The information stream that needs to be transmitted is initially transmit diversity/space-time encoded into G substreams. Each of the substreams is beamformed and transmitted using one group of antennas. The transmitter can optimize the weights applied by the weight vector based on feedback provided by a receiver.

The receiver can process the signals received from the beamformed substreams and can generate a Channel Quality Indication (CQI) value based on the processed substreams. The receiver can independently generate a channel quality indication based on a signal from each beamformed substream or based on a composite signal quality. The receiver can communicate the one or more CQI values in a feedback message or via some other communication link to the transmitter. The receiver can generate the CQI values, for example, based on a pilot signal transmitted by the transmitter.

The transmitter, or more particularly a receiver in communication with the transmitter, can receive the CQI values from the receiver. The transmitter can adjust the beamforming weights applied to one or more of the substreams based on the CQI values. The transmitter may also receive one or more metrics that is indicative of the downlink interference that is attributable to a signal corresponding to a particular access terminal. The downlink interference metric can be determined, for example by one or more receivers in access terminals for which the transmitter signal is not optimized or by one or more receivers positioned at other access points. The transmitter independently adjusts the weights in each of the substreams to maximize the signal quality at the receiver, adjusts the weights of multiple substreams to maximize the signal quality at the receiver, adjusts the weights in each of the substreams to improve signal quality at a receiver while simultaneously minimizing inter-cell interference experienced in other cells or coverage areas, or some combination thereof. The transmitter can be configured to select from a predetermined grid of weights or can be configured to continuously vary one or both of the amplitude and phase of one or more individual weights.

Figure 1:
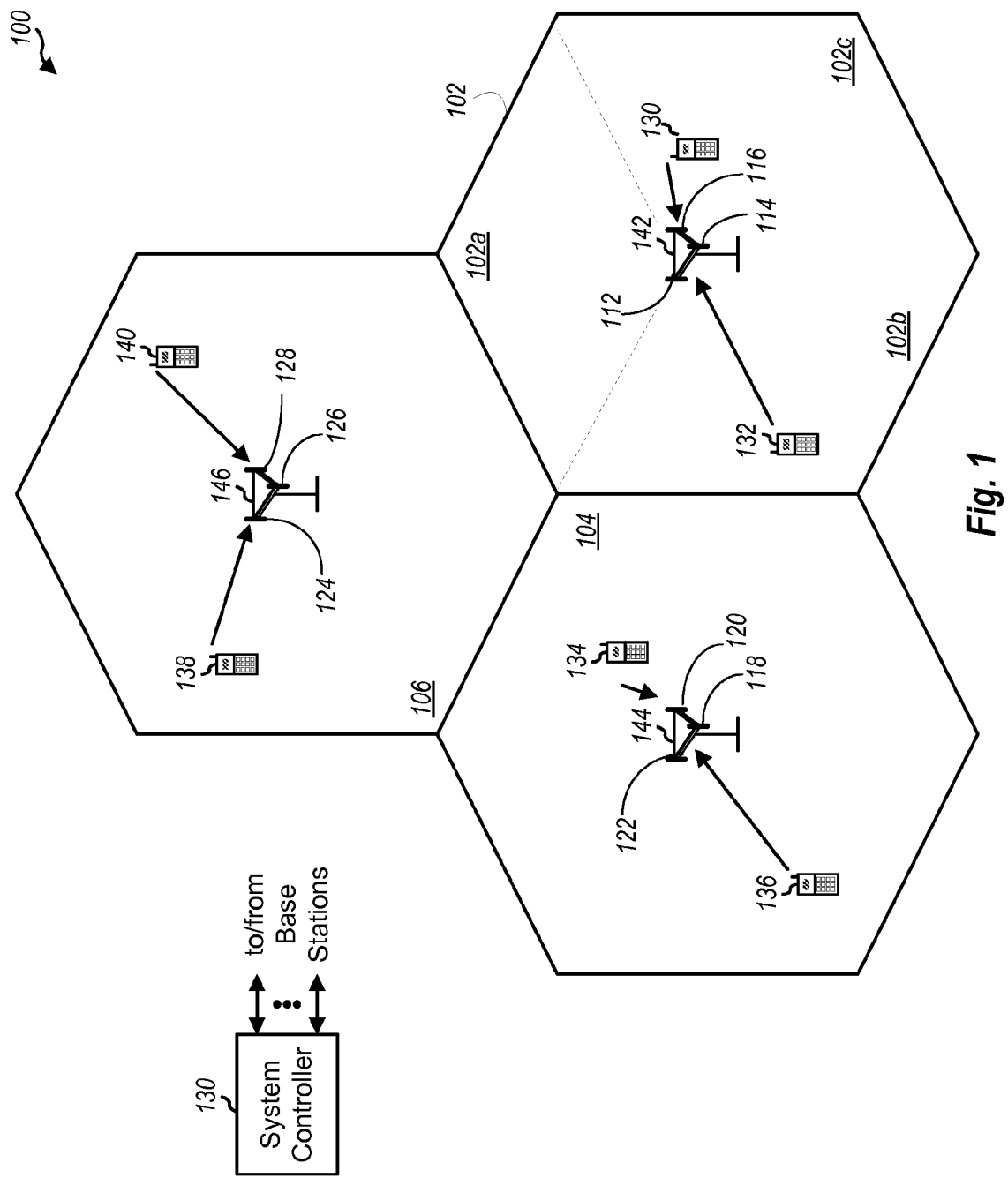
FIG. 1 is a simplified functional block diagram of an embodiment of a wireless communication system.

FIG. 1 is a simplified functional block diagram of an embodiment of a multiple access wireless communication system 100. A multiple access wireless communication system 100 includes multiple cells, e.g. cells 102, 104, and 106. In the embodiment of FIG. 1, each cell 102, 104, and 106 may include an access point 150 that includes multiple sectors.

The multiple sectors are formed by groups of antennas each responsible for communication with access terminals in a portion of the cell. In cell 102, antenna groups 112, 114, and 116 each correspond to a different sector. For example, cell 102 is divided into three sectors, 120a-102c. A first antenna 112 serves a first sector 102a, a second antenna 114 serves a second sector 102b, and a third antenna 116 serves a third sector 102c. In cell 104, antenna groups 118, 120, and 122 each correspond to a different sector. In cell 106, antenna groups 124, 126, and 128 each correspond to a different sector.

Each cell and sector of a cell is configured to support or otherwise serve several access terminals which are in communication with one or more sectors of the corresponding access point. For example, access terminals 130 and 132 are in communication with access point 142, access terminals 134 and 136 are in communication with access point 144, and access terminals 138 and 140 are in communication with access point 146. Although each of the access points 142, 144, and 146 is shown to be in communication with two access terminals, each access point 142, 144, and 146 is not limited to communicating with two access terminals and may support any number of access terminals up to some limit that may be a physical limit, or a limit imposed by a communications standard.

As used herein, an access point may be a fixed station used for communicating with the terminals and may also be referred to as, and include some or all the functionality of, a base station, a Node B, or some other terminology. An access terminal (AT) may also be referred to as, and include some or all the functionality of, a user equipment (UE), a user terminal, a wireless communication device, a terminal, a mobile terminal, a mobile station, a subscriber station, or some other terminology.

It can be seen from FIG. 1 that each access terminal 130, 132, 134, 136, 138, and 140 is located in a different portion of its respective cell than each other access terminal in the same cell. Further, each access terminal may be a different distance from the antenna groups corresponding to the access point with which it is communicating. Both of these factors provide situations, in addition to environmental and other conditions in the cell, to cause different channel conditions to be present between each access terminal and the antenna group corresponding to the access terminal with which it is communicating.

Each access terminal, for example 130, typically experiences unique channel characteristics not experienced by any other access terminal because of the varying channel conditions. Furthermore, the channel characteristics change over time and vary due to changes in access terminal location.

The access points 142, 144, and 146 can implement space-time encoding transmit diversity to alleviate some of the effects of fades in signal quality due in part to changes in the channel conditions. The access points 142, 144, and 146 can be configured to generate a multiple of distinct space-time encoded substreams. The access points 142, 144, and 146 can also be configured to beamform each distinct space-time encoded substream. Thus, each substream at each of the access points 142, 144, and 146 can be beamformed using a multiplicity of antennas. The space-time encoded and beamformed substreams can each be received at the access terminals 130, 132, 134, 136, 138, and 140 after traversing substantially uncorrelated channel conditions. This improves the ability of the access terminals 130, 132, 134, 136, 138, and 140 to receive signals under all operating conditions and minimizes the probability that the access terminals 130, 132, 134, 136, 138, and 140 will experience a signal fading condition that results in the inability to maintain communications with the serving access point.

The access points 142, 144, and 146 can beamform the substreams by weighting each of the signals coupled to the corresponding multiplicity of antennas by a weight. Each space-time encoded substream is split or otherwise divided into multiple copies, and the multiple copies are weighted using a weight vector of the same dimension as the number of multiple copies.

The access points 142, 144, and 146 can use feedback from each of the access terminals, for example 130, to optimize the weights applied to one or more of the substreams. The access points 142, 144, and 146 can transmit pilot signals that are not beamformed or that are beamformed with known weight vectors to facilitate channel analysis by the access terminals 130, 132, 134, 136, 138, and 140. The pilot signals can be one or more known signals that can be transmitted periodically in time, frequency, or a combination of time and frequency. In other embodiments, the pilot signals are not periodic, but are transmitted according to a predetermined algorithm. For example, the pilot signals can be scheduled pseudo-randomly and the access terminals 130, 132, 134, 136, 138, and 140 can have the ability to predict the position and occurrence of the pilot signals. In other embodiments, the access points 142, 144, and 146 can schedule pilot signals at the request of one or more access terminals, for example 130.

Each of the access terminals, for example 130, can receive the pilot signals from its serving access point 142 and can estimate the channel for each of the independent substreams. If the access point beamforms the pilot substreams, the access terminal 130 can compensate for the predetermined beamforming weights applied to the pilot substreams during the process of estimating a channel.

The access terminal 130 generates a Channel Quality Indication (CQI) value based on the channel estimates. In one embodiment, the access terminal 130 generates a CQI value representative of a channel estimate for each of the substreams. In another embodiment, the access terminal 130 generates a CQI value based on a combination of multiple channel estimates.

The access terminal 130 can generate a CQI value that is representative of the channel estimate or can generate a CQI value that is indicative of a change in the channel estimate. For example, the access terminal 130 can generate a CQI value that merely indicates whether a composite signal quality improved or degraded, relative to a prior channel estimate. In another embodiment, the access terminal 130 generates CQI values for each channel estimate, and the CQI value represents a magnitude of the channel estimate.

The access terminal 130 generates one or more feedback messages having the one or more CQI values and communicates the CQI values back to the access point corresponding to the pilot signals used to generate the CQI values.

The access point, for example 142, may also receive one or more estimates of downlink interference. For example, an access terminal from another sector, e.g. 132, or an access terminal from another cell, e.g. 140, may estimate the level of downlink interference generated by the beamformed signals from some other sector 120c or cell 102. Alternatively, a receiver at an access point, for example 146 can estimate the downlink interference generated at another access point, e.g. 142. The estimate of the downlink interference can be transmitted to the access point 142 that is assumed to be the source of interference.

The access point, for example 142, receives the CQI values and downlink interference estimates and adjusts the weights of the beamforming weight vectors to improve the signal quality experienced at the access terminal 130, and may adjust the weights to concurrently decrease the downlink interference experienced in other cells or secotrs. The access point 142 can optimize the beamforming weights for each of the beamformed substreams. The access point 142 can vary the beamforming weights according to a predetermined algorithm and can, for example, vary the weights continuously, in predetermined increments, or vary the weights by selecting a weight from a predetermined set of weights. The access point 142 can vary the amplitude, phase, or combination of amplitude and phase of a weight.

Figure 2:
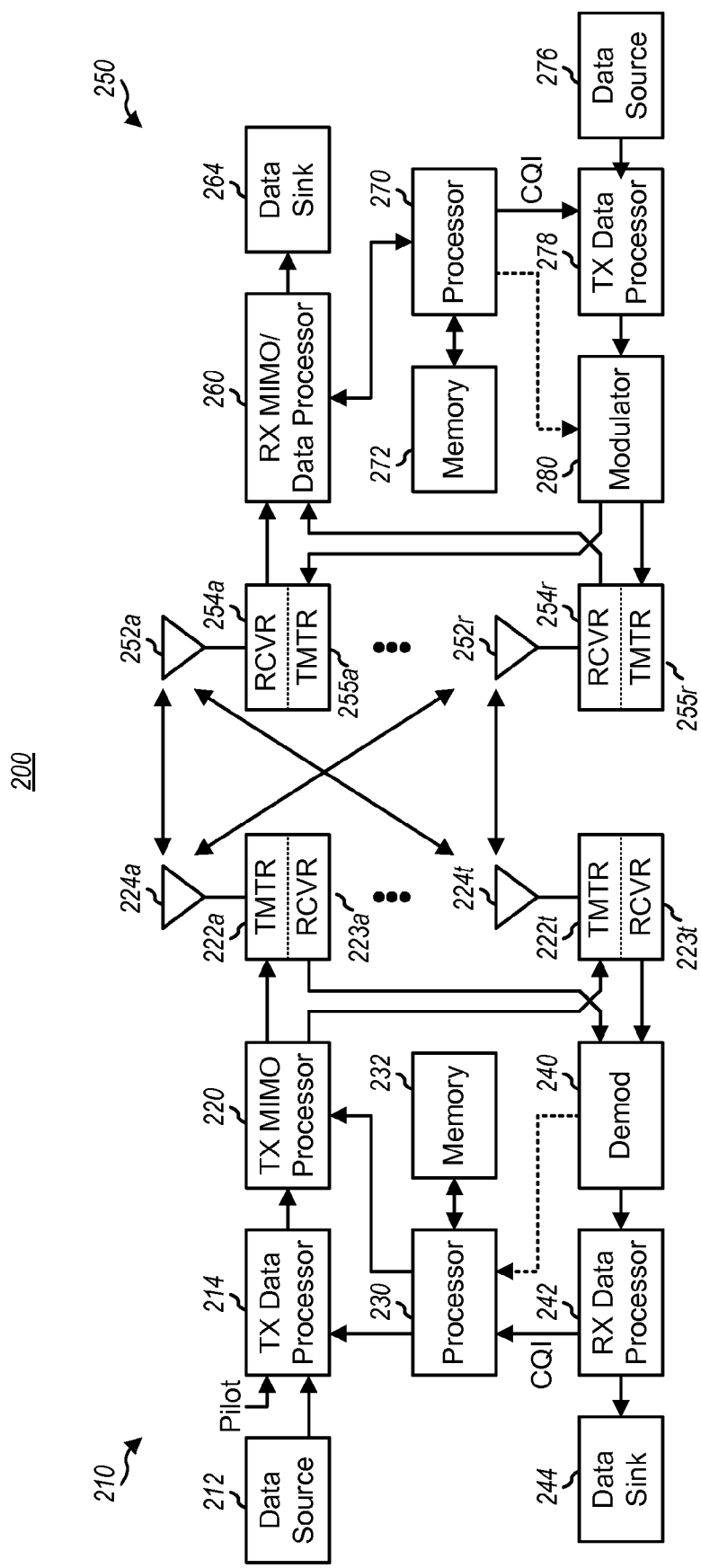
FIG. 2 is a simplified functional block diagram of an embodiment of a transmitter and receiver in a multiple access wireless communication system.

The above embodiments can be implemented utilizing transmit (TX) processor 220 or 260, processor 230 or 270, and memory 232 or 272, as shown in FIG. 2. The processes may be performed on any processor, controller, or other processing device and may be stored as computer readable instructions in a computer readable medium as source code, object code, or otherwise.

FIG. 2 is a simplified functional block diagram of an embodiment of a transmitter and receiver in a multiple access wireless communication system 200. At transmitter system 210, traffic data for a number of data streams is provided from a data source 212 to a transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data. In some embodiments, TX data processor 214 applies space-time encoding and beamforming weights to the symbols of the data streams based upon the user to which the symbols are being transmitted and the antenna from which the symbol is being transmitted. In some embodiments, the beamforming weights may be generated based upon channel response information that is indicative of the condition of the transmission paths between the access point and the access terminal. Further, in those cases of scheduled transmissions, the TX data processor 214 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions provided by processor 230. In some embodiments, the number of parallel spatial streams may be varied according to the rank information that is transmitted from the user.

The modulation symbols for all data streams are then provided to a TX MIMO processor 220, which may further process the modulation symbols (for example, for OFDM). TX MIMO processor 220 then provides $N_T$ symbol streams to $N_T$ transmitters (TMTR) 222a through 222t. TX MIMO processor 220 applies beamforming weights to the symbols of the data streams based upon the user to which the symbols are being transmitted and the antenna from which the symbol is being transmitted from that users channel response information.

Each transmitter 222a through 222t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

The transmitter system 210 can also be configured to receive signals from the one or more antennas 224a through 224t. A corresponding receiver 223a through 223t receives and processes the receive signals. Each receiver 223a through 223t can be configured to amplify, filter, and frequency convert its corresponding received signals to a baseband signal that is coupled to a demodulator 240.

The demodulator 240 can demodulate the received signals to recover the received data and information. The output of the demodulator 240 is coupled to a RX data processor 242. The RX data processor 242 can be configured to extract the various information elements that are contained in the received signals. Some of the information can be overhead information that is used by the transmitter system 210, while other information can be user data that can be processed for output to a user or other destination device (not shown) via the data sink 244.

Overhead information can include CQI values that are generated by the receiver system 250 and transmitted to the transmitter system 210. The RX data processor 242 couples the CQI values or the messages having the CQI values to the processor 230. The processor 230 in conjunction with executable code stored in memory 232 operates to determine, based on the received CQI values, the changes to be made to the beamforming weights applied to the various signal substreams in either at the TX data processor 214 or the TX MIMO processor 220.

At receiver system 250, the transmitted modulated signals are received by $N_R$ antennas 252a through 252r and the received signal from each antenna 252 is provided to a respective receiver (RCVR) 254. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide the rank number of "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possibly other channel characteristics, and provides these quantities to a processor 270.

The processor 270, in combination with executable code stored in memory 272, can generate the one or more CQI values based on the channel estimates. The processor 270 can also access one or more stored CQI values corresponding to earlier channel estimates that are stored in memory 270 when generating a current CQI value. The processor 270 couples the one or more CQI values to a TX data processor 278.

The TX data processor 278 formats the CQI values for transmission back to the transmitter system 210. The TX data processor 278 can, for example, generate one or more feedback messages containing the CQI values. The TX data processor 278 couples the feedback messages to a modulator 280 where the messages are modulated according to a predetermined format. The modulated messages are coupled to one or more transmitters 255a-255r where the modulated feedback messages are upconverted and transmitted back to the transmitter system 210.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel (or a transmission channel) of the MIMO channel and corresponds to a dimension.

Figure 3:
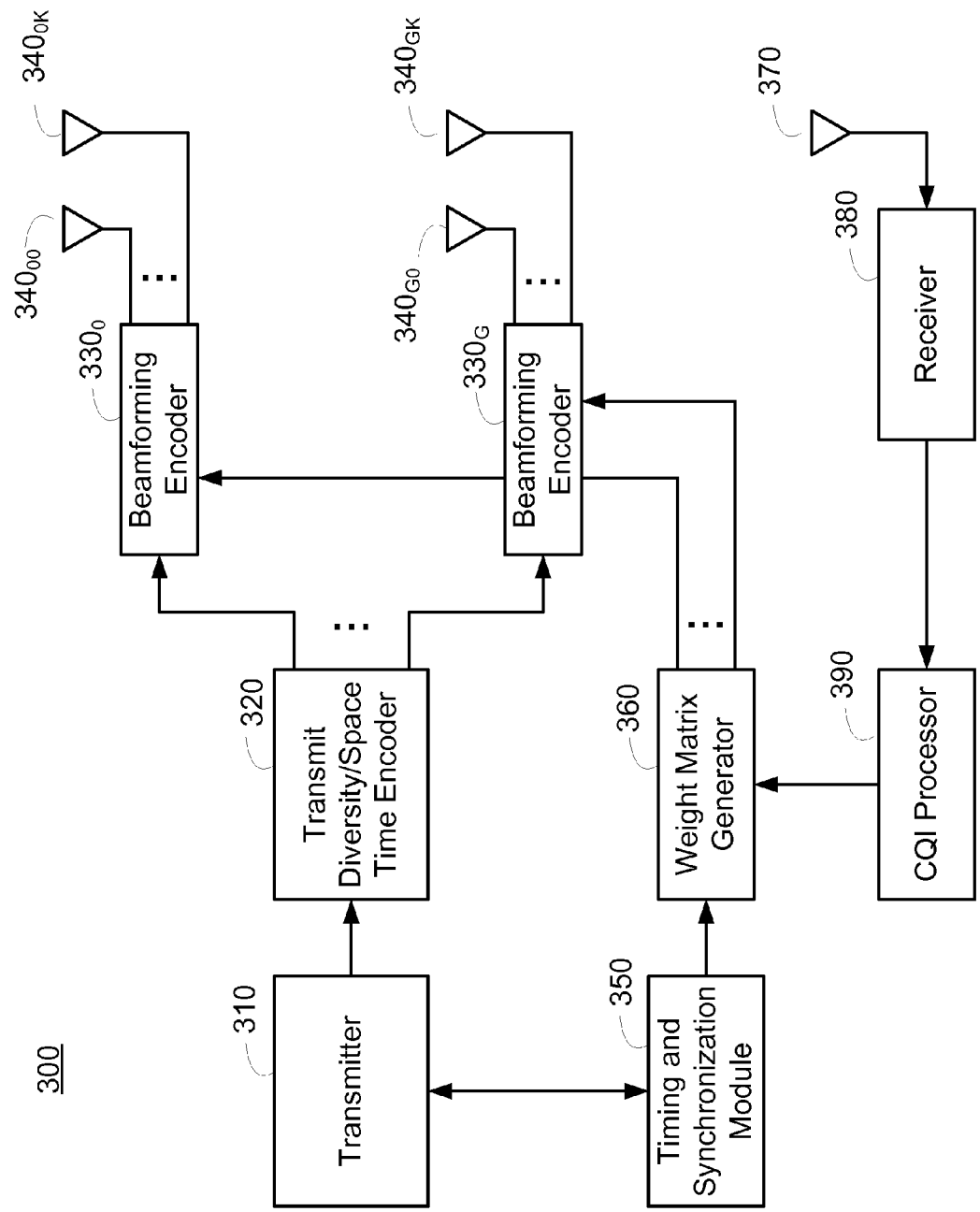
FIG. 3 is a simplified functional block diagram of an embodiment of a transmitter system having beamformed space-time coding transmit diversity.

FIG. 3 is a simplified functional block diagram of an embodiment of a transmitter system 300 implementing beamforming of space time encoded signals, where the beamforming weights are optimized using CQI feedback from a receiver. The simplified functional block diagram of FIG. 3 is limited to the portion of the transmitter system that is related to beamforming space-time encoded signals. Other portions of the transmitter system are omitted for purposes of brevity and clarity. The transmitter system 300 can be integrated in, for example, an access point of the communication system of FIG. 1, and can be an embodiment of the transmitter system of FIG. 2.

The transmitter system 300 includes a transmitter 310 coupled to a transmit diversity/space-time encoder 320. The transmit diversity/space-time encoder 320 couples a plurality of encoded signals to a plurality of beamforming encoders $330_0$-$330_G$. The beamforming encoders $330_0$-$330_G$ couple the beamformed signals to a plurality of antennas $340_{00}$-$340_{GK}$. A timing and synchronization module 350 is coupled to a weight matrix generator 360 that is coupled to the plurality of beamforming encoders $330_0$-$330_G$.

The transmitter 310 is configured to process the samples to generate a modulated signal stream. For example, the transmitter 310 can be configured to generate a plurality of samples of an Orthogonal Frequency Division Multiplex (OFDM) symbol from a plurality of information bits. The transmitter 310 can be configured to map the information bits to the various subcarriers of the OFDM symbol, and modulate the information bits onto the subcarriers according to a predetermined modulation format. The transmitter 310 can frequency convert the OFDM symbol to a desired RF transmit frequency. The output of the transmitter 310 in such an embodiment is a serial signal stream of the samples of the OFDM symbol at the desired transmit RF frequency.

The output of the transmitter 310 is coupled to a time diversity/space-time encoder 320. The time diversity/space-time encoder 320 is configured to divide the signal stream from the transmitter 310 into a plurality, G, of signal streams, alternatively referred to as substreams. The time diversity/space time encoder 320 operates on the plurality of signal streams to produce modified versions of the signal streams. For example, the time diversity/space-time encoder 320 can be configured to pass one substantially unmodified signal stream and can be configured to modify each of the remaining G-1 signal streams. Generally, one signal stream can be considered to be unmodified, because all signal streams can be normalized to a particular signal stream.

The time diversity/space-time encoder 320 can be configured to, for example, delay, negate, conjugate, rotate, and the like, or some combination thereof, each of the G-1 signal streams. The time diversity/space-time encoder 320 can introduce delay to a particular signal stream using a variable delay, a delay line, tapped delay line, digital delay, and the like, or some combination of delay elements. The time diversity/space-time encoder 320 can be configured to negate a signal stream using, for example, an inverting amplifier. The time diversity/space-time encoder 320 can be configured to conjugate the a signal stream using, for example, a rotator, an inverter coupled to a quadrature phase signal component, and the like, or some combination thereof. Additionally, the time diversity/space-time encoder 320 can be configured to rotate a signal stream using one or more multipliers operating on in-phase and quadrature signal components, one or more multipliers weighting the phase component, delay elements, and the like, or some combination thereof.

Typically, the time diversity/space-time encoder 320 performs a distinct modification on each of the signal streams, such that transmit diversity can be achieved by transmitting the plurality of G signal streams over a plurality, G, of distinct antennas. In a typical time diversity/space time encoded system, the plurality of G antennas can be separated spatially. In the embodiment of FIG. 3, each of the G distinct time diversity/space time encoded signal streams is subjected to additional processing. Another manner of providing diversity gain at the receiver is by using transmit beamforming where substantially the same information symbol is transmitted from multiple antennas. The signals from each of the multiple antennas can be weighted differently such that the total signal to noise ratio at the receiver can be maximized. This different signal weighting can be accomplished using different antenna gains or by weighting the individual signals coupled to each of the antennas. Although weighting of the signals is illustrated as occurring just prior to the antennas, the beamform weighting can also be performed earlier in the transmit chain, and can be performed by operating on the signal streams using time domain weighting or frequency domain weighting of the signals.

In the embodiment of FIG. 3, each of the G signal substreams is separately beamformed using a plurality of antennas. Each of the distinct signal substreams from the time diversity/space-time encoder 320 is coupled to one of a plurality of beamforming encoders, $330_0$-$330_G$. The number of beamforming encoders $330_0$-$330_G$ corresponds to the number of transmit diversity signal streams generated by the time diversity/space-time encoder 320.

Each beamforming encoder, e.g. $330_0$, is configured to generate a plurality of weighted signal streams, each of which is applied to a corresponding antenna. Each beamforming encoder, e.g. $330_0$, receives one of the plurality of signals streams from the transmit diversity/space-time encoder 320. The beamforming encoder $330_0$ splits the signal into a plurality, K, of duplicate signal streams and weights each of the K duplicate signal streams with an associated beamforming weight. The beamforming encoder $330_0$ couples the weighted signal streams to a plurality, K, of antennas $330_{00}$-$330_{0K}$ associated with the particular beamforming encoder $330_0$.

Therefore, the total number of antennas is equal to the number of time diversity/space-time encoded groups or substreams, G, multiplied by the number of beamforming signal streams, K, generated for each time diversity/space-time encoded group. In the embodiment of FIG. 3, there are a total of N=G×K antennas. The transmitter system 300 embodiment of FIG. 3 illustrates an equal number of beamforming signal streams for each of the time diversity/space-time signals. However, other embodiments can have different beamforming dimensions for different time diversity/space-time signals.

A weight matrix generator 360 is configured to generate the weight vectors used by each of the beamforming encoders $330_0$-$330_G$. Each vector within the weight matrix can correspond to one beamforming encoder, e.g. $330_0$. Typically, each of the weight vectors is distinct, but there is no requirement that the weight vectors be distinct.

Each of the weights, w, in a weight vector can have an associated amplitude, A, and phase rotation, $\phi$. The weight matrix generator 360 can be configured to generate a fixed weight matrix or can be configured to generate a variable weight matrix. In some embodiments, the weight matrix generator 360 can be configured to generate a combination of fixed weight vectors and variable weight vectors. The weight matrix generator 360 can be configured to vary the weights based on, for example, time, events, or a combination of time and events.

If estimates of the channel from the transmit antennas to a receiver are available at the transmitter, the weight matrix generator 360 can determine the optimal values for the weights in each weight vector that maximize the Signal to Noise Ratio (SNR) or some other metric related to received signal quality. The transmitter system 300 need not have knowledge of the actual channel estimates, but may operate on some other signal metric that is based on or otherwise related to the receive signal quality or the channel estimates.

The weight matrix generator 360 is configured to generate the multiple weight vectors based on information that is supplied to the transmitter system 300 by a receiving device, such as an access terminal. In the embodiment shown in FIG. 3, the transmitter system 300 is configured to receive the feedback information from a wireless link.

The transmitter system includes a receive antenna 370 that is configured to receive a signal transmitted by an access terminal (not shown). Although a distinct receive antenna 370 is depicted in the embodiment, the transmitter system 300 can utilize multiple receive antennas or can both transmit and receive signals using the same antenna or antennas. Therefore, in some embodiments, there is no dedicated receive antenna 370. Rather, one or more of the antennas 340 are used as receive antennas.

The receive antenna 370 couples the received signals to a receiver 380, that is configured to amplify, filter, and frequency convert the received signal to a signal for further processing. Typically, the receiver 380 operates to output a baseband signal having the received information of interest, which includes the CQI values generated at one or more access terminals.

The receiver 380 couples the output signal to a CQI processor 390. The CQI processor 390 operates on the baseband signal from the receiver 380 to recover CQI values that are transmitted by access terminals. The CQI processor 390 can, for example, extract the CQI values from particular overhead messages or from particular dedicated messages. The CQI values can, for example, populate predetermined fields in messages or can be identified using a predetermined header, prefix, or other identifier.

The CQI processor 390 couples the CQI values and identity of the corresponding access terminal to the weight matrix generator 360. The weight matrix generator 360 can modify or generate new beamforming weights or weight vectors based in part on the CQI values reported by the receiving access terminals.

In a weight vector, for example, $w_g = [w_{g1}\ w_{g2}\ \ldots\ w_{g,N/G}]$, each weight can include an amplitude component and a phase component, for example, $w_0 = A_0 \cdot e^{j\phi_0}$. The weight matrix generator 360 can be configured to introduce intentional temporal variations in the vector weights in a number of ways. The weight matrix generator 360 can be configured to vary the amplitude components, phase components, or a combination thereof. Additionally, the weight matrix generator 360 can be configured to vary the weights within any given weight vector independently, or vary the weights based on, or as a function of, one of the weights.

As an example, the weight matrix generator 360 can be configured to maintain substantially constant amplitude components and vary the phase components based in part on information fed back to the transmitter from an access terminal. The weight matrix generator 360 can independently vary the phase components of the individual weights or can vary the phase component of a second phase component based on a first phase component.

As another example, the weight matrix generator 360 can be configured to maintain substantially constant phase components and vary the amplitude components of the various weights based in part on information fed back to the transmitter from an access terminal. For example, the weight matrix generator 360 can keep $\phi_0$ and $\phi_1$ constant and can vary first and second amplitude components. The weight matrix generator 360 can independently vary the amplitude components of the individual weights, or can vary the amplitude component of a second amplitude component based on a first phase component. In another embodiment, the weight matrix generator 360 can be configured to vary both the amplitude and phase components of at least some of the beamforming weights.

The rate at which the weight matrix generator 360 varies the desired weight components can be fixed or can vary. The weight matrix generator 360 can be configured to vary the components based on a rate of the CQI feedback, passage of time, occurrence of events, or a combination thereof. The weight matrix generator 360 can be configured to use independent rates for each varied component when varying multiple weight components. Alternatively or additionally, the weight matrix generator 360 can be configured to use the same rate or independent rates for each of the vectors in the weight matrix. In general, the weight matrix generator 360 can be configured to vary the individual weight components and the rate at which the individual weight components are varied using completely independent functions for each component or rate.

In one embodiment, the access terminals transmit the CQI values at a rate that is based on an OFDM symbol rate. For example, the transmitter system 300 can receive CQI values from an access terminal and the weight matrix generator 360 can vary the weights in the weight matrix on a per frame basis, where a frame is composed of a predetermined number of OFDM symbols. The weight matrix generator 360 can vary the weight vectors upon receipt of CQI values or can update the weight vectors based on a predetermined multiple of CQI values.

The timing and synchronization module 350 is configured to synchronize the timing of the weight matrix generator 360 with the timing used in the transmitter 31 0. For example, the timing and synchronization module 350 can include a clock that is synchronized to system time used by the transmitter 310 when generating the transmit stream. In one embodiment, the timing and synchronization module can be synchronized to the OFDM symbol timing of the transmit stream such that the weight matrix generator 360 can generate time varying weights that vary on symbol boundaries.

The beamforming encoders $330_0$-$330_G$ can be configured to weight the various space-time encoded substreams in a time domain operation or a frequency domain operation. In an embodiment in which the access terminals are co-located or where the transmitter system 300 is configured to dedicate OFDM symbols to particular access terminals, it may be convenient to apply the weighting vectors to the substreams in the time domain. However, in embodiments in which each OFDM symbol includes information for multiple access terminals corresponding to distinct CQI values, it may be convenient to apply the weighting in the frequency domain, such that the different subcarriers may be weighted to correspond to the channel conditions experienced at the receiving access terminals. The choice between time domain versus frequency domain application of the weight vectors is not a limitation on the use of CQI to optimize beamforming weights. Rather, the choice of one domain over another is typically determined based on the processing power required to implement the respective embodiments.

Figure 4:
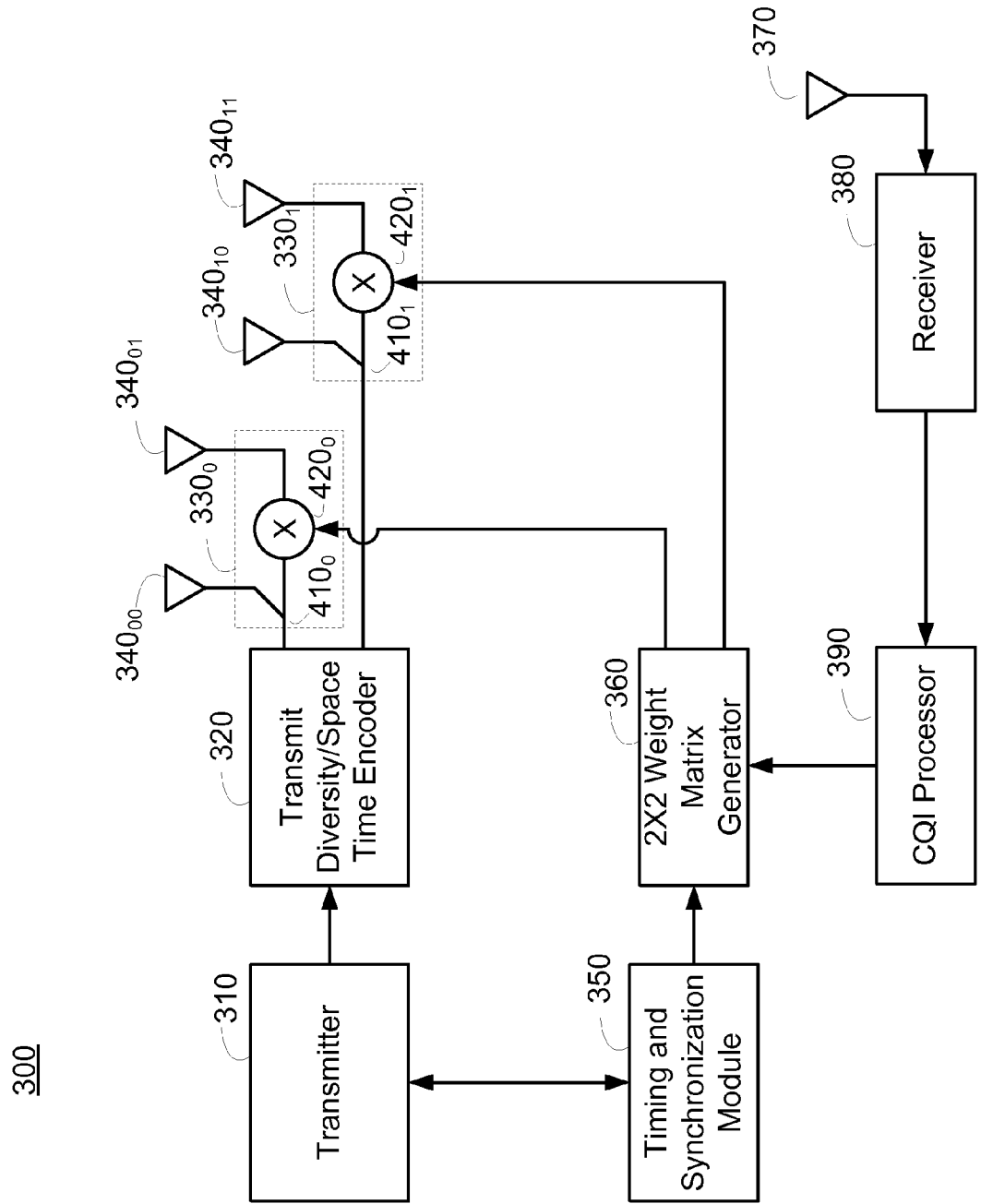
FIG. 4 is a simplified functional block diagram of an embodiment of a transmitter system having beamformed space-time coding transmit diversity.

FIG. 4 is a simplified functional block diagram of an embodiment of a transmitter system 300 configured for beamforming. In the embodiment of FIG. 4, the transmitter system 300 is configured with four total antennas and is configured to generate transmit diversity/space time coding over two distinct groups. The embodiment of FIG. 4 illustrates a particular embodiment of the generalized transmitter system illustrated in FIG. 3.

In the embodiment of FIG. 4, the transmitter 310 is configured to generate a transmit stream that can be, for example, a stream of a plurality of OFDM symbols frequency translated to a transmit RF frequency. The transmitter 310 couples the transmit stream to the transmit diversity/space-time encoder 320.

The transmit diversity/space-time encoder 320 is configured to generate a group of two encoded transmit streams from the input transmit stream. The transmit diversity/space-time encoder 320 can, for example, split the input transmit stream into two substantial duplicates. The transmit diversity/space-time encoder 320 can output a first of the two substantial duplicates as a first encoded transmit stream and can further process the second of the two substantial duplicates before outputting it as the second encoded transmit stream. The transmit diversity/space-time encoder 320 can process the second of the two substantial duplicates by, for example, delaying, conjugating, negating, rotating, and the like, or some combination thereof, the signal stream.

The transmitter system 300 beamforms each of the group of transmit diversity/space-time encoded signal substreams. A first group of antennas includes antennas $340_{00}$ and $340_{01}$, while a second group includes antennas $340_{10}$ and $340_{11}$. The transmitter system 300 beamforms the first transmit diversity/space-time encoded signal substream using the first group of antennas $340_{00}$ and $340_{01}$, and beamforms the second transmit diversity/space-time encoded signal substream using the second group of antennas $340_{10}$ and $340_{11}$.

The transmit diversity/space-time encoder 320 couples the first encoded transmit stream to a first beamforming encoder $330_0$. The first beamforming encoder $330_0$ includes a signal splitter $410_0$ that is configured to split the first encoded transmit stream into two substantial duplicates. The first beamforming encoder $330_0$ couples a first output from the splitter $410_0$ to the first antenna $340_{00}$ associated with the transmit diversity group. The first beamforming encoder $330_0$ couples a second output from the splitter $410_0$ to a multiplier $420_0$, that is configured to weight the signal stream with a complex weight received from the weight matrix generator 360. The first beamforming encoder $330_0$ couples the weighted transmit stream to the second antenna $340_{01}$ associated with the transmit diversity group.

The transmitter system 300 beamforms the second encoded transmit stream in a similar fashion. The transmit diversity/space-time encoder 320 couples the second encoded transmit stream to a second beamforming encoder $330_1$. The second beamforming encoder $330_1$ includes a signal splitter $410_1$ that is configured to split the second encoded transmit stream into two substantial duplicates. The second beamforming encoder $330_1$ couples a first output from the splitter $410_1$ to the first antenna $340_{10}$. The second beamforming encoder $330_1$ couples a second output from the splitter $410_1$ to a multiplier $420_1$ that is configured to weight the signal stream with a complex weight received from the weight matrix generator 360. The second beamforming encoder $330_1$ couples the weighted transmit stream to the second antenna $340_{11}$.

A timing and synchronization module 350 is configured to synchronize with the system time used by the transmitter 310 when generating the transmit stream. The timing and synchronization module 350 can also be configured to monitor predetermined events or states of the transmitter 310. The timing and synchronization module 350 couples the timing and event status information to the weight matrix generator 360.

The weight matrix generator 360 is illustrated as a 2×2 weight matrix generator, because each transmit diversity group is beamformed over two distinct antennas. In the general case, the weight matrix generator 360 generates a 1×2 vector for each of the two transmit diversity groups, resulting in a 2×2 weight matrix. However, because in this example the beamforming encoders $330_0$ and $330_1$ weight only one of the two signals routed to the antennas, the weight matrix generator 360 need only generate one complex weight for each transmit diversity group.

The weight matrix generator 360 effectively generates a 1×2 vector for each transmit diversity group in which the first entry is predetermined to be unity. Thus, there is only one variable complex weight for each transmit diversity group. The weights can be regarded as normalized to a first weight.

The weight matrix generator 360 can modify or generate the antenna weights using feedback from an access terminal receiving the beamformed signals. An access terminal can receive the two beamformed signals and can generate one or more CQI values based on the signals. The access terminal can generate the CQI values based in part on the channel seen at the receiver from the two beams.

The channel seen at the access terminal receiver in the first beam is given by $g_0=h_0+w_0\cdot h_{0'}$, where $h_0$ is the channel from a first antenna $340_{00}$ to the receiver and $h_{0'}$ is the channel from the second antenna $340_{01}$ of the same beam to the receiver. Similarly, the channel seen at the receiver in the second beam is given by $g_1=h_1+w_1\cdot h_{1'}$, where $h_1$ is the channel from a first antenna $340_{10}$ of the second beam to the receiver, and $h_{1'}$ is the channel from a second antenna $340_{11}$ of the second beam to the receiver.

The access terminal receiver can estimate the channel based on a pilot signal transmitted by the transmitter system 300. In one embodiment, the access terminal informs the transmitter system 300, via the receiver 380 and CQI processor 390, which channel $g_0$ or $g_1$ is stronger. The weight matrix generator 360 can adjust the weights of the weight vectors accordingly.

In one embodiment, the weight matrix generator 360 is configured to change the phase of the weight $\theta_i$ corresponding to the weaker channel according to a predetermined algorithm. For example, the weight matrix generator 360 can increment the phase by a predetermined increment size.

The access terminal can update the CQI values based on the revised beams. The updated CQI values inform the transmitter system 300 whether the corresponding channel gain has improved or not. If the channel gain improves, the weight matrix generator 360 can continue to change the phase in the same manner until such change does not yield any improvement in the channel gain. If the change in the phase degrades the channel gain, then the weight matrix generator 360 changes the phase in the opposite manner, again, until no further improvement in the channel gain is attainable.

Once the phase has been optimized, the weight matrix generator 360 can then adjust and optimize the corresponding amplitude $A_i$. Note that the phase and amplitude need not be continuous functions, but the can be selected from a set of discrete amplitudes and phases as shown in FIG. 5.

The CQI values need not correspond to a single channel estimate, but can correspond to a value based on a combination of channel estimates. The weight matrix generator 360 can be configured to optimize the weights based on a metric derived from a combination of channel estimates or other parameters. For example, the weight matrix generator 360 can be configured to adjust the weights to maximize $|g_0|^2+|g_1|^2$.

The access terminal can be configured to generate and feedback a CQI value that corresponds to a difference between $|g_0|^2+|g_1|^2$ at the current transmission and the previous value. The weight matrix generator 360 uses this CQI value in an adaptive manner to update the weights such that this difference is minimized.

Figure 5:
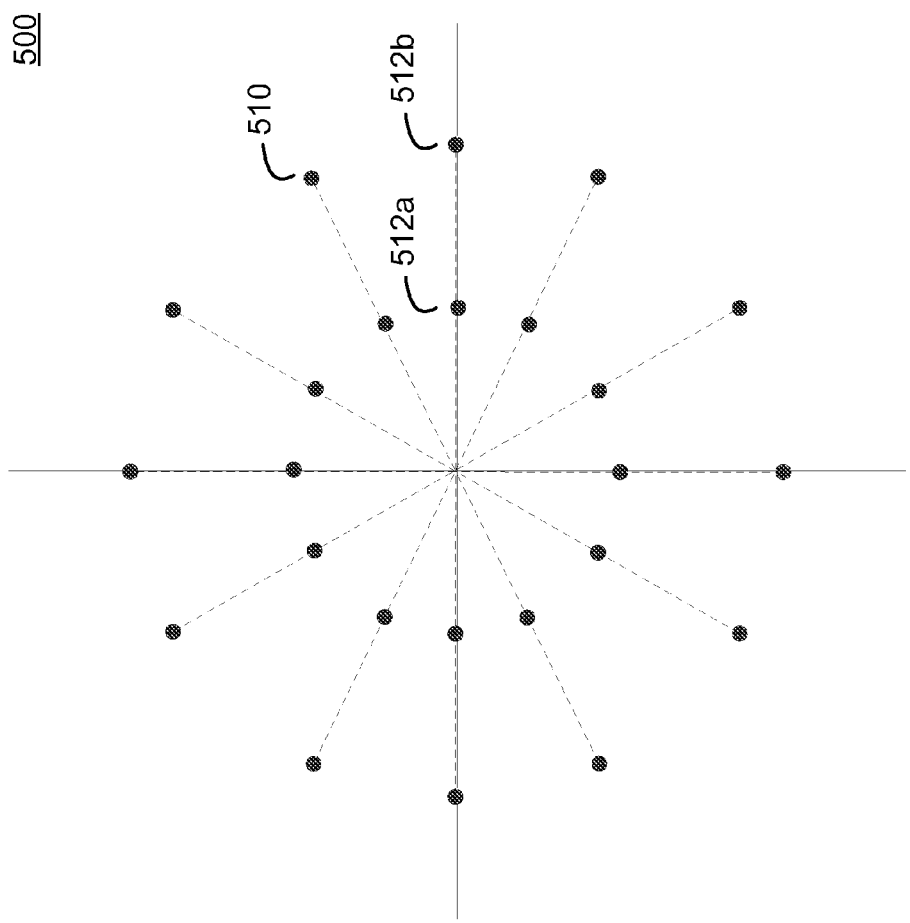
FIG. 5 is an example of a beamforming weight constellation diagram.

FIG. 5 is an embodiment of a constellation diagram 500 that illustrates a set of weights that can be selected by the transmitter for use in a weight vector. The constellation diagram 500 includes 24 possible weights. Minimizing the number of possible weights in a constellation minimizes the degrees of freedom and processing associated with varying the beamforming weights.

Twelve weights, for example weight 512a, are positioned substantially uniformly about a circle of a first radius and twelve weights, for example 510 and 512b, are positioned substantially uniformly about a circle having a second, larger radius. The phases of the weights on the first circle coincide with the phases of the weights on the second circle. This configuration allows the transmitter to vary the amplitude of a weight without requiring any variation in the phase of the weight. The transmitter may also vary the phase of a weight without varying the amplitude of the weight.

For example, a transmitter may determine that a weight presently corresponding to weight 512a should be increased in amplitude. The transmitter may accomplish the amplitude variation by selecting weight 512b to replace weight 512a. Similarly, the transmitter can introduce or vary a phase rotation by selecting a constellation point residing on the same circle.

Figure 6:
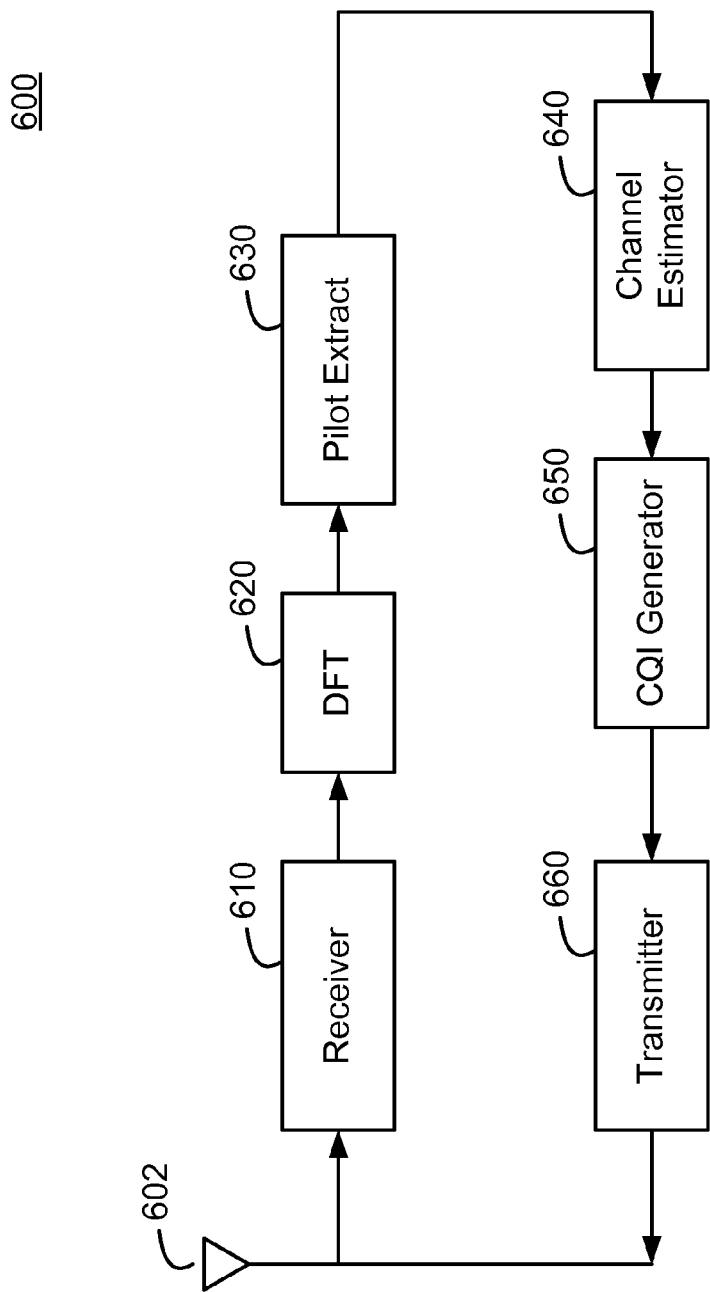
FIG. 6 simplified functional block diagram of an embodiment of a receiver configured to generate a channel quality indication based on beamformed space-time coded receive signals.

FIG. 6 is a simplified functional block diagram of an embodiment of a receiver system 600 configured to generate and feedback a CQI value based on signals in multiple beams. The receiver system 600 can be part of, for example, a receiver system of FIG. 2 or an access terminal of FIG. 1.

The receiver system 600 is configured to generate channel estimates for each of multiple beams based on pilot signals in one or more OFDM symbols carried within each beam. The receiver system 600 utilizes the channel estimates to determine one or more CQI values that are transmitted across a wireless link back to the transmitter.

The receiver system 600 includes an antenna 602 configured to receive beamformed signals, such as the transmit diversity/space-time encoded beamformed signals from the access point of FIG. 1 or the transmitter systems of FIGS. 3 or 4. The antenna 602 couples the beamformed signals to a receiver 610 configured to perform RF processing and frequency translation. The receiver 610 can be configured to process the received beamformed signals to baseband signals.

The receiver 610 couples the beamformed signals to a Discrete Fourier Transform (DFT) module 620 for processing. In the context of an OFDM symbol, the DFT module 620 is configured to receive time domain samples of an OFDM symbol and perform a Fourier transform to produce the corresponding frequency domain information in each of a set of substantially orthogonal subcarriers. The DFT module 620 can perform the Fourier transform using, for example, a Fast Fourier Transform engine.

The subcarrier output from the DFT module 620 is coupled to a pilot extraction module 630. The transmitter system includes one or more pilot signals in predetermined positions within an OFDM symbol. The receiver system 600 is aware of the algorithm used to position the pilot signals in the OFDM symbols. The pilot extraction module 630 extracts those subcarriers corresponding to the pilot signals based on the knowledge of the pilot placement algorithm. In a simple pilot placement algorithm, the pilot signals occupy evenly spaced subcarriers in each OFDM symbol.

The pilot extraction module 630 couples the extracted pilot signal information to a channel estimator 640. The channel estimator 640 processes the pilot signals to determine a channel estimate.

The DFT module 620, pilot extraction module 630, and channel estimator 640 operate to produce a channel estimate for each of the signal beams. The transmit diversity/space-time encoding and beamforming performed at the transmitter system typically ensure that each channel is substantially uncorrelated with any other channel.

The channel estimator 640 couples the multiple channel estimates to the CQI generator 650. The CQI generator 650 generates one or more CQI values based on the channel estimates. In one embodiment, the CQI generator 650 is configured to generate a CQI value that is representative of each channel estimate. For example, the CQI value can correspond to the magnitude of the channel estimate. In another embodiment, the CQI generator 650 can be configured to generate a CQI value based on a combination of multiple channel estimates. For example, the CQI generator 650 can generate a CQI value representative of a sum of the magnitude squared of the channel estimates. In another embodiment, the CQI generator 650 can be configured to indicate an improvement in signal quality or can indicate which of the beams experiences a more favorable channel. In other embodiments, the CQI generator 650 can implement a combination of CQI generation techniques or some other CQI generation technique.

The CQI generator 650 couples the CQI values to a transmitter 660. The transmitter 660 formats the CQI value or values for transmission back to the transmitter system. The transmitter 660 can generate an overhead message having the CQI values and can process the overhead message to an RF signal. The transmitter 660 couples the RF signal having the CQI values to the antenna 602 for transmission to the transmitter system.

Figure 7:
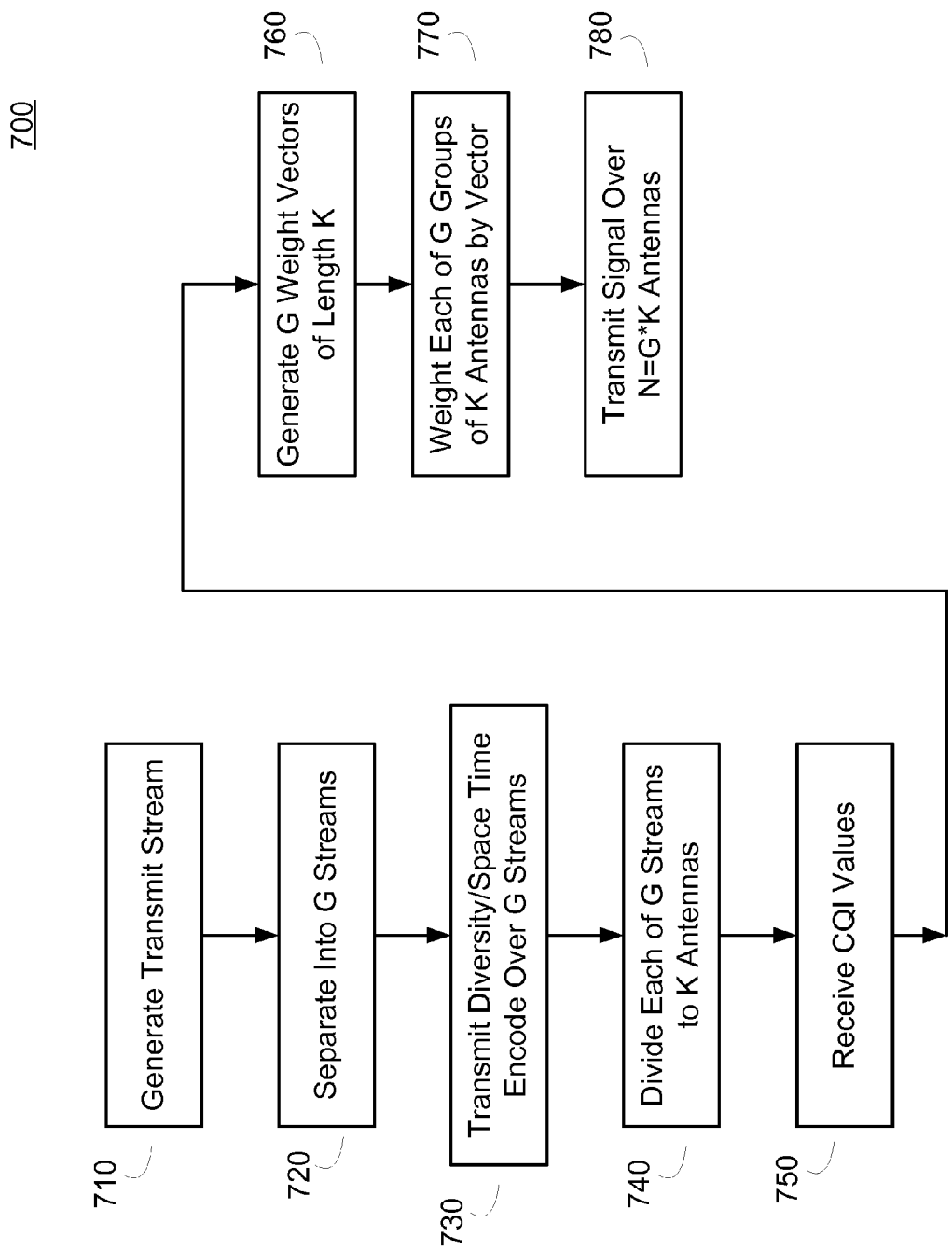
FIG. 7 is a simplified flowchart of an embodiment of a method of providing transmit diversity using beamformed transmit diversity/space-time coding.

FIG. 7 is a simplified flowchart of a method 700 of providing transmit diversity using beamformed transmit diversity/space-time coding. The method 700 can be performed, for example, at the access points of FIG. 1 or by the transmitter systems shown in FIGS. 3 or 4. The method 700 is described as being performed by a transmitter system for the purposes of discussion. The various processing operations described within the method 700 can be implemented in time domain processing of the signals or in frequency domain processing of the signals.

The method 700 begins at block 710 where the transmitter system generates a transmit stream. The transmit stream includes one or more pilot signals. For example, the transmitter system can generate a transmit stream of OFDM symbols that have been frequency converted to a desired RF operating frequency. At least a portion of the OFDM symbols include pilot signals.

The transmitter system proceeds to block 720 and separates the transmit stream into G groups, where G represents an integer greater than one. As an example, the transmitter system can be configured to divide the transmit stream into G substreams using a splitter.

The transmitter system proceeds to block 730 and time diversity/space time encodes the G signals streams. One or more of the G signal substreams can be processed to introduce transmit diversity into the transmit stream. In one embodiment, the transmitter system can be configured to process or modify a signal stream by delaying, conjugating, negating, rotating, or otherwise processing the signals stream. Additionally, the transmitter system can implement a combination of a plurality of processing techniques when providing transmit diversity.

The transmitter system can, e.g. at block 740, divide each encoded transmit signal from the G encoded signal streams into a group of K signals. The transmitter system can be configured, for example, to divide each of the encoded transmit streams into K signals using a 1:K signal splitter. Therefore, following the division at each of the G signal streams the transmitter system is configured to support N=G×K signals.

The method 700 is described as dividing each of the G signal substreams into a group of K signals for the sake of clarity and ease of description. However, the method 700 is not limited to having an equal number of antennas in each group. Thus, in an alternative embodiment, the transmitter system may divide each of a first subset of the signals streams into groups of K1 signals while dividing each of a second subset of signals into groups of K2 signals, where K1 is not equal to K2. In another embodiment, the transmitter system may divide each of the G signal streams to a different number of streams for beamforming.

The transmitter system can, e.g. block 750, process one or more received CQI values corresponding to at least one access terminal. The CQI values can indicate to the transmitter system the quality of the received signals. In particular, the transmitter system can compare the most recent CQI values to one or more prior CQI values to determine an adjustment to the beamforming weight vectors.

For example, the transmitter system can determine that the most recent change to the weight vector resulted in improved signal quality at the receiver, based on comparison of CQI values. The transmitter system can determine that the weight vector should be adjusted in the same direction as previously adjusted, or can determine that some other aspect or dimension of the weight vectors should be adjusted.

Once the transmitter system divides each of the G signal streams into a group of substreams and processes the CQI values, the transmitter system proceeds to block 760 and generates a weight vector for each of the G groups. In the embodiment illustrated in the flowchart, the transmitter system generates G weight vectors of length K. The transmitter system can generate distinct weight vectors for each of the G groups, or can use the same weight vector for a plurality of groups. Each of the weight vectors represents the weights used to beamform the group of K signal streams.

In one embodiment, the transmitter system is configured to initially select a default weight vector from a fixed constellation of weight vectors. The transmitter system then modifies the weight vector based on the CQI values received from the access terminals. The transmitter system can vary the weights in a weight vector substantially continuously or can vary the weights in one or more discrete increments. In another embodiment, the transmitter system can be configured to select a weight from a predetermined constellation of weights.

The transmitter system can be configured to vary the weights in a predetermined manner. For example, the transmitter system can be configured to initially optimize the phase of a weight, while maintaining a substantially constant amplitude. The transmitter system can then optimize the amplitude of the weight after the phase is optimized. The transmitter system can continue to alternate optimization of phase and amplitude to continually optimize the beamforming weights over changing channel conditions.

The transmitter system proceeds to block 770 and weights each of the K signal streams in each of the G groups based on the associated weight vector. The transmitter system proceeds to block 780 and transmits the signals over N=G×K antennas. Each group of K antennas transmits a beamformed representation of the corresponding signal stream from the group of G time diversity/space-time encoded signal streams. The transmitter system can continue to perform the method 700 for all transmitted information or can be configured to selectively activate and deactivate beamforming.

Figure 8:
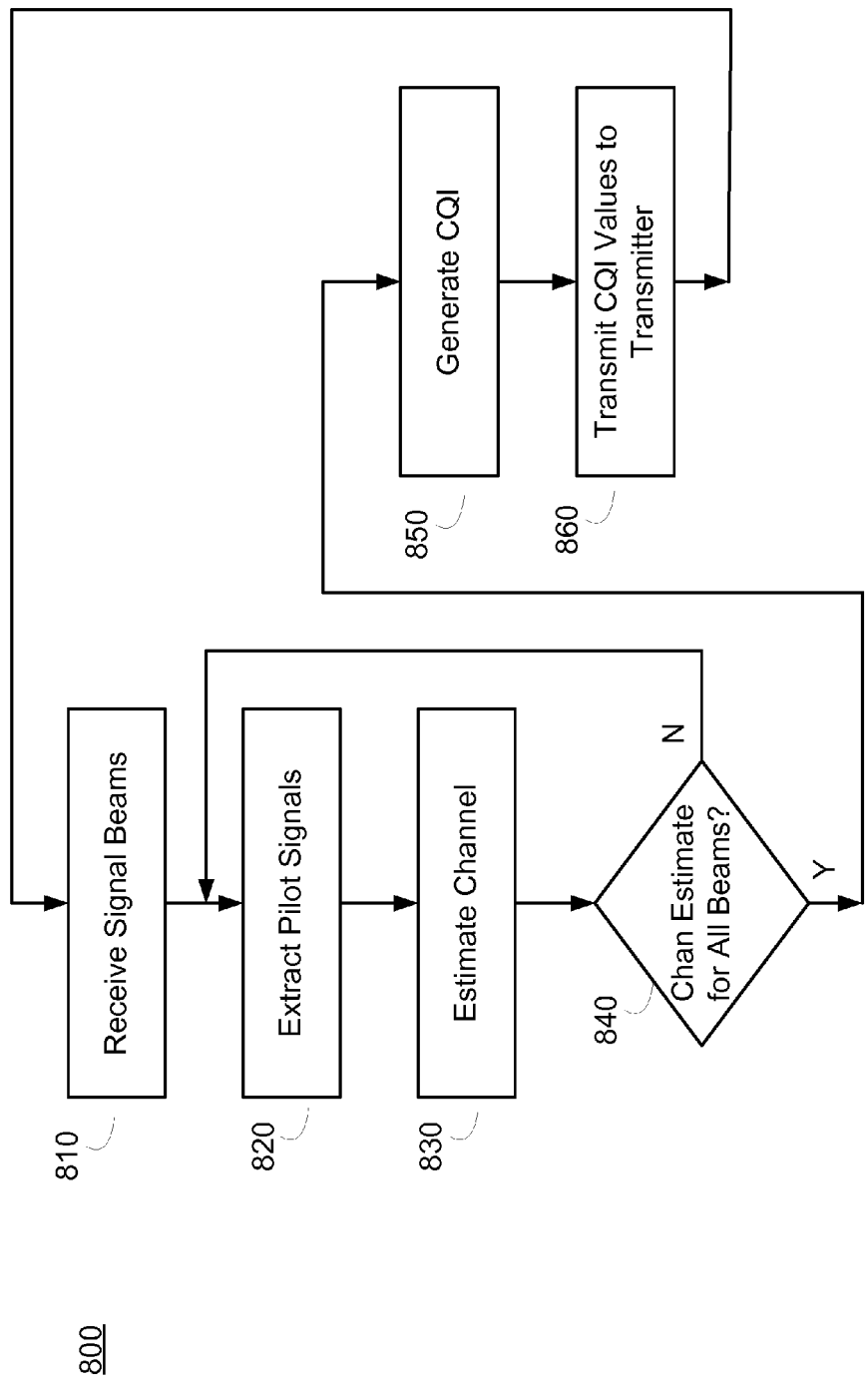
FIG. 8 is a simplified flowchart of an embodiment of a method of generating feedback information from beamformed transmit diversity/space-time encoded signals.

FIG. 8 is a simplified flowchart of an embodiment of a method 800 of generating feedback information from beamformed transmit diversity/space-time encoded signals. The method 800 can be performed, for example, by an access terminal of FIG. 1 or a receiver system of FIG. 6.

The method 800 begins at block 810 where the receiver system receives transmit diversity/space-time encoded signals over multiple beams. The receiver system proceeds to block 820 and extracts the pilot signals from the received signals.

In one embodiment, the pilot signals occupy a subset of subcarriers of OFDM symbols received by the receiver system. The pilot signals can be extracted from the OFDM symbol by transforming the time domain symbol samples to corresponding frequency domain subcarriers. The subcarriers corresponding to the pilot signals can be extracted from the entire set of frequency domain subcarriers.

The receiver system can compensate for the transmit diversity/space-time encoding as part of the pilot extraction process or as part of the channel estimation process. After extracting the pilot signals, the receiver system proceeds to block 830 and estimates the channel for a particular beam, corresponding to a particular transmit diversity/space-time code. If the receiver system has not previously compensated for the transmit diversity/space-time code corresponding to a particular beam, the code can be accounted for during channel estimation. The knowledge of the pilot signals allows the receiver system to estimate the channel corresponding to the beamformed and space-time encoded signal stream.

After estimating the channel, the receiver system proceeds to decision block 840 and determines whether the channel estimates for all of the space-time encoded beams has been performed. Because each space-time encoded beam is substantially uncorrelated to any other space-time encoded beam, the receiver system can determine a distinct channel estimate for each space-time encoded stream.

If the receiver system determines that not all of the channel estimates have been determined, the receiver system proceeds from decision block 840 back to block 820 to extract the pilot signals corresponding to another space-time encoded beam. In situations where the transmitter system introduces delay as part of the space-time encoding process, the pilot extraction process may need to perform an FFT on delayed OFDM symbol samples to extract the pilot signals.

If, at decision block 840, the receiver system determines that the channel estimates for all beamformed space-time encoded signals have been processed, the receiver system proceeds to block 850. At block 850 the receiver system generates one or more CQI values based on the channel estimates.

The receiver system can generate CQI values that are representative of each of the channel estimates, representative of a predetermined combination of multiple channel estimates, representative of changes in channel estimates, changes in a predetermined combination of channel estimates, and the like, or some other representation of signal or channel quality. In one embodiment, the receiver system generates a CQI corresponding to a magnitude of each channel estimate. In another embodiment, the receiver system generates a CQI that is the sum of the magnitude squared of each channel estimate. In another embodiment, the receiver system generates a CQI that identifies the strongest beam. In another embodiment, the receiver system generates a CQI that ranks the relative strength of a predetermined number of beams.

After generating the one or more CQI values, the receiver system proceeds to block 860 and transmits the CQI values to the transmitter system. The receiver system can return to block 810 to process additional received signals. For example, the receiver system can execute the method 800 to update the CQI values each OFDM symbol, each frame of symbols, or some other increment.

Figure 9:
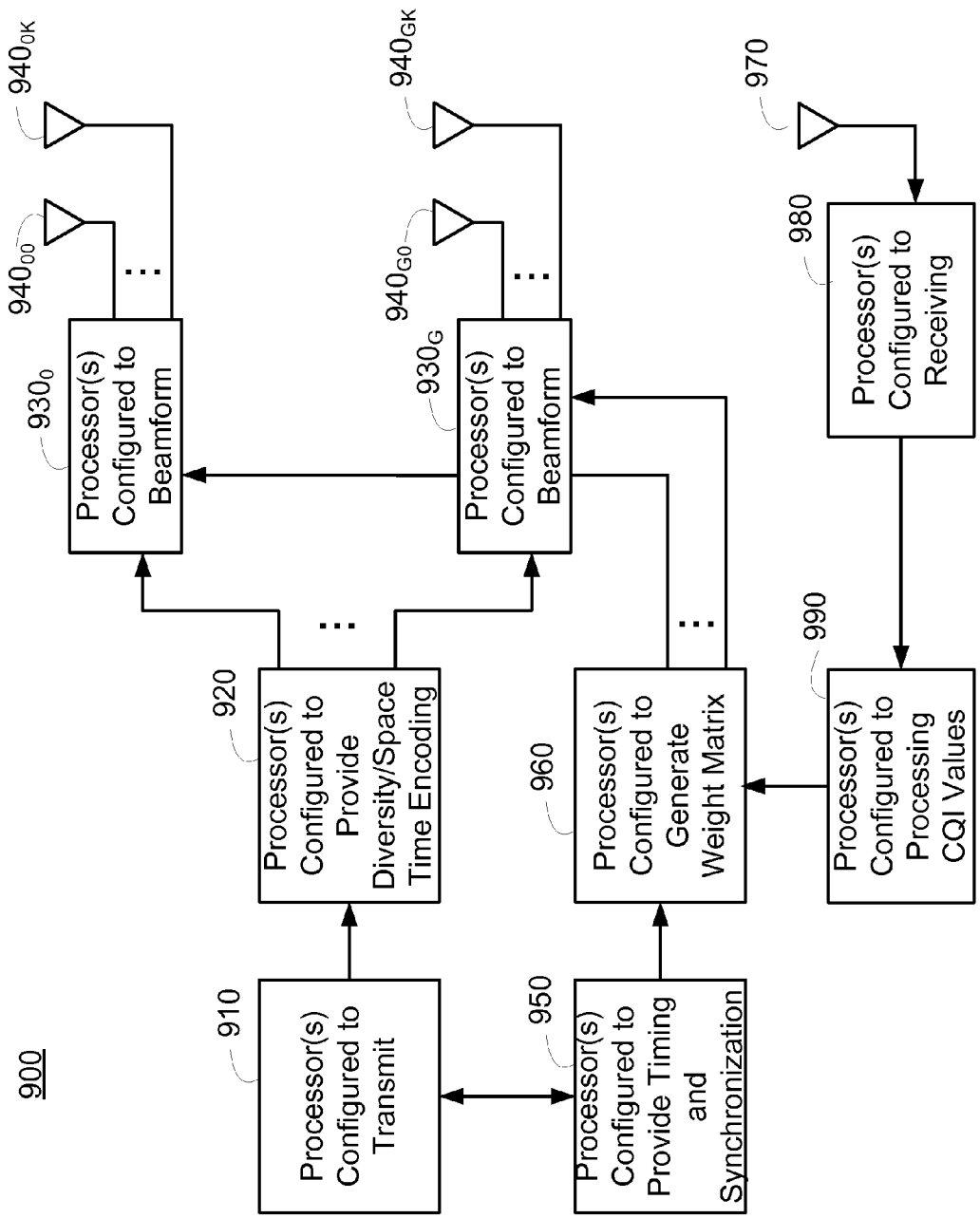
FIG. 9 is a simplified functional block diagram of an embodiment of a transmitter system having beamformed space-time coding transmit diversity.

FIG. 9 is a simplified functional block diagram of an embodiment of a transmitter system 900 configured for beamforming. The transmitter system 900 includes a processor(s) configured to transmit 910 that is configured to generate a transmit stream. The processor(s) configured to transmit 910 can include, for example, a signal source, modulator, frequency converter, and the like. In one embodiment, the processor(s) configured to transmit 910 is configured to generate a transmit stream of OFDM symbols frequency converted to a transmit frequency.

The processor(s) configured to transmit 910 couples the transmit stream to a processor(s) configured to transmit diversity/space-time encoding 920. The processor(s) configured to transmit diversity/space-time encoding 920 is configured to generate a plurality, G, of transmit diversity/space-time encoded signal streams from the input transmit stream. The processor(s) configured to transmit diversity/space-time encoding 920 generates the plurality of signal streams from the input transmit stream and encodes each of the G signal streams to introduce transmit diversity.

The processor(s) configured to transmit diversity/space-time encoding 920 can include, for example, one or more elements configured to delay, conjugate, negate, rotate, or otherwise process a signal stream.

The processor(s) configured to transmit diversity/space-time encoding 920 couples each of the plurality of encoded transmit streams to a corresponding plurality of processor(s) configured to beamform, $930_0$-$930_G$. The transmitter system 900 separately beamforms each of the encoded transmit streams, and thus, implements a processor(s) configured to beamform, e.g. $930_0$, for each encoded transmit stream.

Each processor(s) configured to beamform, e.g. $930_0$, separates its corresponding encoded transmit stream into a plurality of K beamforming substreams. The processor(s) configured to beamform, e.g. $930_0$, weights the K beamforming substreams with a weight from a corresponding beamforming weight vector provided by a processor(s) configured to generating a weight matrix 960.

The processor(s) configured to beamform, e.g. $930_0$, couples the K weighted beamforming substreams to a plurality of corresponding antennas, e.g. $940_{00}$-$940_{0K}$, where the beamformed signals are transmitted to one or more receivers.

A processor(s) configured to provide timing and synchronization 950 couples the information relating to events and timing synchronization to the processor(s) configured to generate the weight matrix 960. A receive antenna 970 is configured to couple a receive signal to a processor(s) configured to receive a signal 980. The processor(s) configured to receive a signal is configured to receive one or more feedback messages from each access terminal supported by the transmitter system. The feedback messages can include one or more CQI messages that are indicative of channel quality at the receiving access terminal.

The processor(s) configured to receive 980 processes the received signal into a baseband signal and couples the baseband signal to a processor(s) configured to process channel quality indication (CQI) values 990. The processor(s) configured to process CQI values 990 operates on the baseband signals to extract the one or more messages that include the CQI values and extract the CQI values from the messages.

The processor(s) configured to processing the CQI values also retains the correspondence between access terminals and CQI values, where CQI values corresponding to more than one access terminal are received at the transmitter system 900.

The processor(s) configured to process the CQI values 990 may also perform some processing on the received CQI values, depending on the format of the CQI values. For example, the processor(s) configured to processing the CQI values may compare the most recent CQI values with one or more previously received CQI values to determine if adjustments to the weight vectors result in improved signal at the access terminals. The processor(s) configured to process the CQI values 990 couples the CQI values, the processed CQI values, or results from processing the CQI values to the processor(s) configured to generate a weight matrix 960.

The processor(s) configured to generate a weight matrix 960 generates a weight vector for each of the processor(s) configured to beamform, $930_0$-$930_G$ based in part on the received CQI values. In general, the processor(s) configured to generate a weight matrix 960 generates a weight for each antenna and thus generates a vector of dimension K for each processor(s) configured to beamform, $930_0$-$930_G$. The processor(s) configured to generate a weight matrix 960 can generate a distinct weight vector for each of the processor(s) configured to beamform, $930_0$-$930_G$, or can supply the same weight vector to two or more processor(s) configured to beamform.

Figure 10:
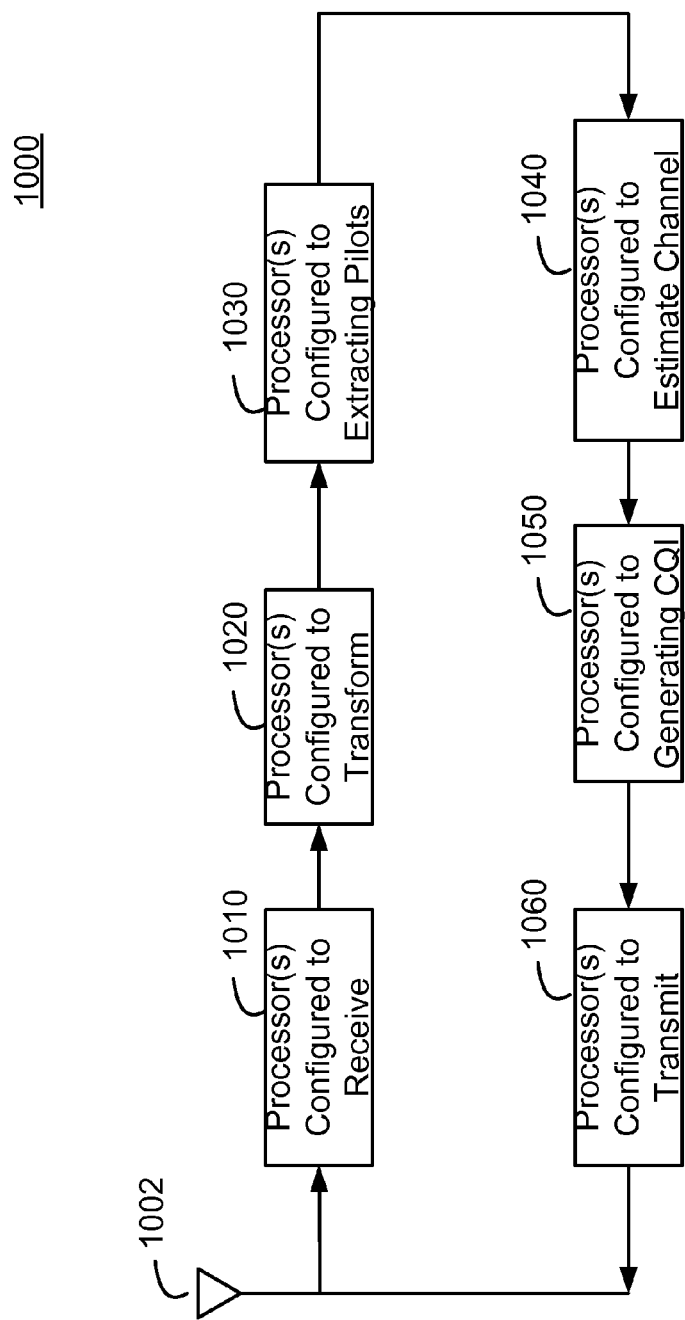
FIG. 10 is a simplified functional block diagram of an embodiment of a receiver configured to generate a channel quality indication based on beamformed space-time coded receive signals.

FIG. 10 is a simplified functional block diagram of an embodiment of a receiver system 1000 configured to generate and feedback a CQI value based on signals in multiple beams. The receiver system 1000 can be part of, for example, a receiver system of FIG. 2 or an access terminal of FIG. 1. In the embodiment shown in FIG. 10, the receiver system 1000 is configured to receive and process OFDM symbols. However, the particular modulation or multiplex technique used to communicate the signals is not a limitation.

The receiver system 1000 includes an antenna 1002 coupled to a processor(s) configured to receive 1010 configured to receive multiple beams, each beam having a distinct space-time encoded version of a signal. The processor(s) configured to receive 1010 is configured to process the received signals to baseband signals and couple the baseband signals to a processor(s) configured to transform 1020 signal samples. The processor(s) configured to transform 1020 can be configured to transform the time domain samples of the baseband signals to their frequency domain counterpart. The processor(s) configured to transform 1020 can implement a DFT or FFT engine to perform the transform.

The processor(s) configured to transform 1020 couples the frequency domain information to a processor(s) configured to extract pilot signals 1030. The frequency domain information of an OFDM symbol corresponds to the individual substantially orthogonal subcarriers. The processor(s) configured to extract pilot signals 1030 extracts the subcarriers and information on the subcarriers corresponding to pilot signals.

The processor(s) configured to extract pilot signals 1030 couples the pilot signals to a processor(s) configured to estimatie a channel 1040. Because the pilot signals represent known transmit information, the channel can be estimated from the received signal. The processor(s) configured to estimate a channel 1040 uses the known pilot signals to recover a channel estimate. The processor(s) configured to estimate a channel 1040 can estimate a channel for each distinct space-time encoded beam.

The processor(s) configured to extract pilot signals 1030 couples the channel estimates to a processor(s) configured to generate CQI values 1050. The processor(s) configured to generate CQI values 1050 generates one or more CQI values based on the channel estimates. The CQI values are indicative of the channel quality or are indicative of a change in channel quality.

The processor(s) configured to generate CQI values 1050 couples the one or more CQI values to a processor(s) configured to transmit 1060 that is configured to process the CQI values into one or more signals from transmission back to the source of the beams. The processor(s) configured to transmit 1060 can be configured to filter, amplify, and upconvert the CQI values or messages containing the CQI values to an RF band for transmission. The processor(s) configured to transmit 1060 couples the RF signal to the antenna 1002 where the signal is broadcast.

The methods and apparatus described herein enable a communication system to benefit from both transmit diversity/space-time encoding and beamforming. A transmitter system can operate to separately beamform each of a group of transmit diversity/space-time encoded signals. The transmitter system can vary the beamforming for each encoded signal stream from the group of transmit diversity/space-time encoded signals. The transmitter system can vary the beamforming for each signal stream based on channel quality information provided from the receiver of the beams. The transmitter system can vary the beamforming to optimize the signal quality at the receiver.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in one or more exemplary embodiments, may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method for providing transmit diversity, the method comprising: generating a plurality of space-time encoded signals from a transmit signal, wherein each space-time encoded signal is associated with a distinct space-time antenna group that comprises multiple antennas;
   receiving a channel quality indication from a first device, wherein receiving the channel quality indication comprises receiving a signal based on a sum of magnitude square of respective channel estimates;
   generating at least one weight vector at a second device based on the channel quality indication, wherein generating the at least one weight vector comprises adjusting a phase of a weight in a weight vector without adjusting an amplitude of the weight until the phase is optimized, and wherein generating the at least one weight vector further comprises selecting weights for a weight vector from a predetermined constellation of weights, wherein the constellation of weights comprises a first plurality of weights positioned substantially uniformly about a first circle having a first radius and a second plurality of weights positioned substantially uniformly about a second circle having a second radius, wherein the second radius is larger than the first radius; and
   beamforming, at the second device, by using the channel quality indication from the first device, the plurality of space-time encoded signals, wherein beamforming a particular space-time encoded signal comprises dividing that space-time encoded signal into multiple duplicate signal streams, separately weighting the multiple duplicate signal streams and providing the weighted signal streams to different antennas in the associated antenna group.

2. The method of claim 1, wherein generating the plurality of space-time encoded signals comprises:
   separating a transmit signal stream into duplicate transmit signal streams; and
   providing one of a delay, rotation, conjugation, or combination thereof to one of the duplicate transmit signal streams.

3. The method of claim 1, wherein receiving the channel quality indication comprises receiving a feedback message from a receiver of a beamformed space-time encoded signal.

4. The method of claim 1, wherein receiving the channel quality indication comprises receiving a signal representative of a channel estimate from a receiver of a beamformed space-time encoded signal.

5. The method of claim 1, wherein receiving the channel quality indication comprises receiving a signal indicating a change in signal quality at a receiver of a beamformed space-time encoded signal.

6. The method of claim 1, wherein generating at least one weight vector comprises adjusting a phase of a weight in a weight vector based on the channel quality indication.

7. The method of claim 1, wherein generating at least one weight vector comprises adjusting an amplitude of a weight in a weight vector based on the channel quality indication.

8. The method of claim 1, further comprising:
receiving a downlink interference estimate; and
wherein generating at least one weight vector comprises generating at least one weight vector based on the channel quality indication and the downlink interference estimate.

9. An apparatus for providing transmit diversity, the apparatus comprising:
a transmitter configured to generate a transmit signal stream;
a transmit diversity encoder configured to receive the transmit signal stream and configured to generate a plurality, G, of transmit diversity/space-time encoded transmit streams from the transmit signal stream, wherein each transmit diversity/space-time encoded stream is associated with a distinct antenna group that comprises multiple antennas;
a weight matrix generator configured to receive a channel quality indication from a first device, wherein the channel quality indication is representative of a sum of magnitude square of respective channel estimates, and generate, at a second device, at least one weight vector from a set of weight vectors based on the channel quality indication, wherein generating the at least one weight vector comprises varying a phase of a weight without varying an amplitude of the weight until the phase is optimized, and wherein generating the at least one weight vector further comprises selecting weights for a weight vector from a predetermined constellation of weights, wherein the constellation of weights comprises a first plurality of weights positioned substantially uniformly about a first circle having a first radius and a second plurality of weights positioned substantially uniformly about a second circle having a second radius, wherein the second radius is larger than the first radius; and
a plurality of beamforming encoders, each of the plurality of beamforming encoders configured to receive one of the plurality of transmit diversity/space-time encoded transmit streams and generate a plurality, K, of weighted substreams based on a weight vector from the set of weight vectors to beamform, at the second device, based on the received channel quality indication from the first device, the plurality of transmit diversity/space-time encoded transmit streams by providing the weighted substreams to different antennas in the associated antenna group.

10. The apparatus of claim 9, further comprising:
a receiver configured to receive the channel quality indication in at least one feedback message; and
a processor configured to extract the channel quality indication from the at least one feedback message and communicate the channel quality indication to the weight matrix generator.

11. The apparatus of claim 9, wherein the channel quality indication is representative of a channel estimate.

12. The apparatus of claim 9, wherein the channel quality indication is representative of a change in channel estimates.

13. The apparatus of claim 9, wherein the weight matrix generator is configured to select weights from a predetermined set of weights.

14. The apparatus of claim 9, wherein the weight matrix generator is configured to vary a phase of at least one weight based on the channel quality indication.

15. The apparatus of claim 9, wherein the weight matrix generator is configured to vary an amplitude of at least one weight based on the channel quality indication.

16. An apparatus for providing transmit diversity, the apparatus comprising: means for generating a plurality of space-time encoded signals from a transmit signal, wherein each space-time encoded signal is associated with a distinct space-time antenna group that comprises multiple antennas;
means for receiving a channel quality indication from a first device, wherein the means for receiving a channel quality indication comprises a means for receiving a signal based on a sum of magnitude square of respective channel estimates;
means for generating at least one weight vector at a second device based on the channel quality indication, wherein the means for generating the at least one weight vector comprises means for adjusting a phase of a weight in a weight vector without adjusting an amplitude of the weight until the phase is optimized, and wherein the means for generating the at least one weight vector comprises means for selecting weights for a weight vector from a predetermined constellation of weights, wherein the constellation of weights comprises a first plurality of weights positioned substantially uniformly about a first circle having a first radius and a second plurality of weights positioned substantially uniformly about a second circle having a second radius, wherein the second radius is larger than the first radius; and
means for beamforming, at the second device, by using the channel quality indication from the first device, the plurality of space-time encoded signals, wherein the means for beamforming a particular space-time encoded signal comprises means for dividing that space-time encoded signal into multiple duplicate signal streams, means for separately weighting the multiple duplicate signal streams and means for providing the weighted signal streams to different antennas in the associated antenna group.

17. A non-transitory computer readable media including instructions thereon configured to cause a transmitter to provide transmit diversity, the instructions comprising: instructions for generating a plurality of space-time encoded signals from a transmit signal, wherein each space-time encoded signal is associated with a distinct space-time antenna group that comprises multiple antennas;
instructions for receiving a channel quality indication from a first device, wherein the instructions for receiving a channel quality indication comprises instructions for receiving a signal based on a sum of magnitude square of respective channel estimates;
instructions for generating at least one weight vector at a second device based on the channel quality indication, wherein the instructions for generating the at least one weight vector comprise instructions for adjusting a phase of a weight in a weight vector without adjusting an amplitude of the weight until the phase is optimized, wherein the instructions for generating the at least one weight vector comprise instructions for selecting weights for a weight vector from a predetermined constellation of weights, wherein the constellation of weights comprises a first plurality of weights positioned substantially uniformly about a first circle having a first radius and a second plurality of weights positioned substantially uniformly about a second circle having a second radius, wherein the second radius is larger than the first radius; and instructions for beamforming, at the second device, by using the channel quality indication from the first device, the plurality of space-time encoded signals, wherein the instructions for beamforming a particular space-time encoded signal comprise instructions for dividing that space-time encoded signal into multiple duplicate signal.

18. The method of claim 1, wherein generating the at least one weight vector further comprises adjusting the amplitude of the weight without adjusting the phase of the weight until the amplitude of the weight is optimized.

* * * * *